Patented Mar. 6, 1951

2,544,087

UNITED STATES PATENT OFFICE 2,544,087

POLYAZO DYESTUFFS

Peter Hindermann, Basel, Switzerland, assignor to J. R. Geigy A. G., Basel, Switzerland No Drawing. Application September 7, 1948, Serial No. 48,157. In Switzerland September 15, 1947

6 Claims. (Cl. 260—160)

The present invention is concerned with the manufacture of copperable disazo and polyazo dyestuffs yielding dyeings with very good fastness properties on cellulose fibres.

The copperable polyazo dyestuffs are very popular because they are simple to use, are very fast to light and have generally good wet-fastness properties. Their importance and range of use has increased in recent years, in particular since the successful manufacture of polyazo dyestuffs whose coppered dyeings on cellulose have adequate fastness properties even on repeated soap-washing. The new dyestuffs of the present invention represent a valuable addition to the group of copperable polyazo dyestuffs with outstanding fastness under wet conditions and to light.

According to the present invention I have found that valuable yellow to reddish brown disazo and polyazo dyestuffs are obtained when 1 mole of a tetrazotised diamine of the general Formula I

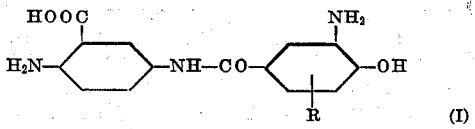

wherein R represents a member selected from the group consisting of H, Br, Cl, CH$_3$ and CH$_3$O radicals, is coupled in any desired order, on the one hand with 1 mol of a derivative of a $\beta$-ketocarboxylic acid selected from the group consisting of 5-pyrazolones and acetoacetic acid arylides and, on the other hand, with 1 mol of a member selected from the group consisting of 5-pyrazolones, acetoacetic acid arylides and naphthol sulfonic acids coupling in o-position to the hydroxyl group. The new copperable polyazo dyestuffs can thus only be symmetrical with respect to the coupling components if 2 mols of a derivative of a $\beta$-ketocarboxylic acid capable of coupling are used, whereas they must be unsymmetrical if they contain a naphthol-sulfonic acid coupling in the position adjacent to the hydroxyl group, since this is present only once in the dyestuff molecule.

According to the choice of coupling components, yellow, yellowish brown or reddish brown dyestuffs are obtained whose coppered dyeings on cellulose are distinguished by very good fastness, even on repeated soap-washing. In choosing the coupling components the solubility in water of the final product should be considered; in general, dyestuffs containing only one sulphonic acid group are preferable to those with several.

The diamines of general Formula I are obtained by methods known per se (see, e. g., Brit. Pat. Spec. No. 341,970), e. g., by the one-sided reaction of a 3-nitro-4-acyloxybenzoyl halide with 1:5-diaminobenzoic acid to give a 3-nitro-4-acyloxybenzoylamino-amino compound and then reducing the latter by usual methods to the diamino compound. Alternatively, 2-nitro-5-aminobenzoic acid may be acylated with the benzoyl halides named and reduced by the usual methods to the diamino compound. Next the acyloxy groups are converted to the corresponding diamines of Formula I by partial hydrolysis. Benzoylation can be carried out in water or in aqueous or water-free organic solvents; it is expedient to add acid-binding agents, such as, e. g., sodium acetate, sodium carbonate, magnesium oxide or tertiary bases like pyridine or dimethylaniline. The oxygen-acyl group often splits off during benzoylation or reduction, according to the stability of the acyloxy compound and the method of working. If desired, the acyl group may be removed from the intermediate product by mild hydrolysis before or after reduction or only from the completed dyestuff molecule. Instead of the nitroacyloxybenzoyl chlorides used in Pat. Spec. No. 341,970 the nitro-hydroxybenzoyl chlorides made from the corresponding nitro-hydroxybenzoic acids by treatment with thionyl chloride may be used, e. g., 3-nitro-4-hydroxybenzoyl chloride.

There come into question as the first and/or second coupling components, derivatives of a $\beta$-ketocarboxylic acid capable of coupling, by which is to be understood, primarily acetoacetic acid arylides and 5-pyrazolones which may also contain further substituents usual in these compounds. There may be enumerated, for example: acetoacetic acid anilide, 2-methoxy-acetoacetic acid anilide, 4-ethoxy-acetoacetic acid anilide, 4-amino-acetoacetic acid anilide, 4-acetylamino-acetoacetic acid anilide, 2-methoxy-4-amino-acetoacetic acid anilide, 2-, 3- or 4-chloracetoacetic acid anilide, 2-, 3- or 4-methyl-acetoacetic acid anilide, 2-methoxy-acetoacetic acid anilide-monosulphonic acid, 3-methyl-5-pyrazolone, 1-phenyl-3-methyl-5-pyrazolone, 1-(4'-aminophenyl)-3-methyl-5-pyrazolone, 1-(4'-aminophenyl)-3-phenyl-5-pyrazolone, 1-(4'-, 3'- or 2'-chlorophenyl) - 3 - methyl-5-pyrazolone, 1-(4'-methylphenyl)-3-methyl-5-pyrazolone, 1-(4'-, 3'- or 2'-sulphophenyl)-3-methyl-5-pyrazolone, 1 - (4' - methyl - 2' - sulphophenyl)-3-methyl-5-pyrazolone, 1-2'- or 3'-chloro-4'-sulphophenyl)-3-methyl-5-pyrazolone, 1-(4'-amino-3'-sulphophenyl)-3-methyl-5-pyrazolone.

When pyrazolones are used as coupling components instead of acetoacetic acid anilides in dyestuffs which are otherwise similarly constructed, the coppered dyeings on cellulose are mostly somewhat faster to light, acid or alkali. A coupling component which has a particularly favourable effect on the drawing power on cellulose fibres is 1-(4'-aminophenyl)-3-methyl-5-pyrazolone.

Examples of naphtholsulphonic acids, coupling in the position adjacent to the hydroxyl group, which may be used as first or second coupling component if desired are: the 1:4-, 1:5-, 2:4-, 2:6-, and 2:7-naphtholsulphonic acids. As substituted naphtholsulphonic acids, there come into question, above all, aminonaphtholsulphonic acids or their derivatives modified at the nitrogen atom, e. g., 2-amino-5-hydroxynaphthalene-7-sulphonic acid and its N-acetyl or N-benzoyl derivatives, 2-phenylamino-5-hydroxynaphthalene-7-sulphonic acid, 2-(4'-aminophenyl)-5-hydroxynaphthalene-7-sulphonic acid, 2-acetylamino- or 2-benzoylamino-6-hydroxynaphthalene-8-sulphonic acid, 1-acetylamino-8-hydroxynaphthalene-4-sulphonic acid, 2-acetylamino-5-hydroxynaphthalene-1-sulphonic acid and, as naphtholsulphonic acids containing azo groups, the monoazo dyestuffs obtained by acid coupling of aminonaphtholsulphonic acids, particularly of 2-amino-5-hydroxynaphthalene-7-sulphonic acid, for example, 1-(4'-hydroxy-3'-carboxyphenylazo-(1'))-2-amino-5-hydroxynaphthalene-7-sulphonic acid and 1-(4'-nitro-2'-carboxyphenylazo-(1'))-2-amino-5-hydroxynaphthalene-7-sulphonic acid.

The copperable polyazo dyestuffs according to the invention are yellow to reddish brown powders, according to their chemical constitution, which dissolve in water. They dye fibres of natural or regenerated cellulose from a dyebath containing Glauber's salt in yellow, yellowish brown to reddish brown shades which, when coppered, become fast to washing and to light.

Coppering may be carried out either in the dyebath or in a fresh bath with the usual copper salts, e. g., with copper sulphate or copper acetate, in a neutral or weakly acid medium.

When desired, copper compounds stable towards alkalis may also be used, such as are obtained, e. g., by reacting copper sulphate with sodium tartrate in a bath made alkaline with sodium carbonate.

The following examples give a few of the methods of carrying out the invention, without limiting the latter in any way. Unless otherwise stated, parts are by weight and temperatures are in degrees centigrade. The relationship of parts by weight to parts by volume is that of kilograms to litres.

*Example 1*

28.7 parts of 1-(3'-amino-4'-hydroxybenzoylamino)-4-aminobenzene-3-carboxylic acid are dissolved cold in 400 parts of water with 8 parts of caustic soda lye, mixed with 13.8 parts of sodium nitrite and added dropwise in the cold, while stirring to 40 parts of concentrated hydrochloric acid and 80 parts of water. After neutralising the excess mineral acid with sodium carbonate the tetrazo compound is combined with an alkaline solution of 37.8 parts of 1-(4'-aminophenyl)-3-methyl-5-pyrazolone in 800 parts of water and 20 parts of sodium carbonate. Coupling immediately takes place and after stirring for several hours at room temperature the diazo reaction is no longer obtained. The dyestuff produced, having the formula

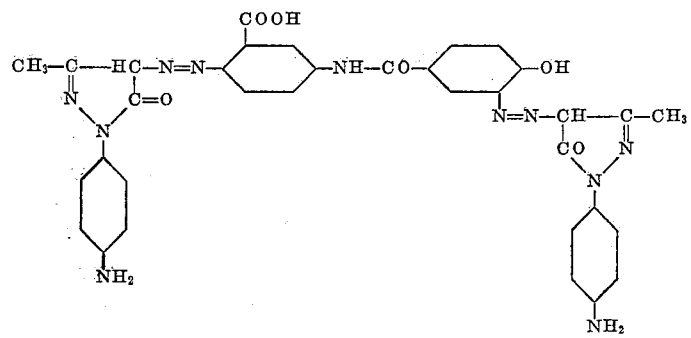

is salted out, filtered off and dried. It is a dark brown powder giving a yellowish brown solution in water and a yellow one in concentrated sulphuric acid. It dyes fibres of natural or regenerated cellulose, after-coppered, in yellowish brown shades with excellent fastness properties.

Similar yellowish brown dyestuffs with equally good fastness properties are obtained if, instead of 37.8 parts of 1-(4'-aminophenyl)-3-methyl-5-pyrazolone there are used 34.8 parts of 1-phenyl-3-methyl-5-pyrazolone, 19.6 parts of 3-methyl-5-pyrazolone, 41.7 parts of 1-(2'-chlorophenyl)-3-methyl-5-pyrazolone, 41.7 parts of 1-(4'-chlorophenyl)-3-methyl-5-pyrazolone, or 50.6 parts of 1-phenyl-3-methyl-5-pyrazolone-3'- or -4'-sulphonamide, all the other details being as in the above example.

*Example 2*

28.7 parts of 1-(3'-amino-4'-hydroxybenzoylamino)-4-aminobenzene-3-carboxylic acid are tetrazotised as described in Example 1, the excess mineral acid is neutralised with sodium carbonate, and the intermediate product formed by combining with 28.7 parts of 2-methoxyacetoacetic acid anilidemonosulphonic acid. After formation of the intermediate product is complete, it is coupled with 23.4 parts of 4-acetylamino-acetoacetic acid anilide, dissolved in 200 parts of water with 5 parts of sodium carbonate, to give the disazo dyestuff. The latter, having the formula

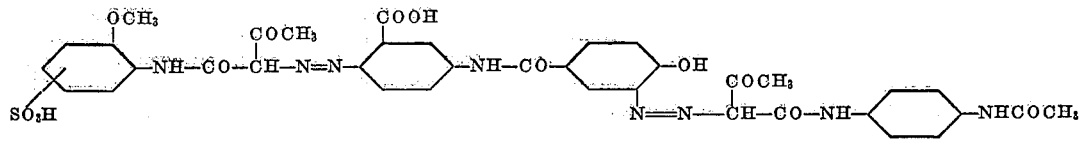

is salted out, filtered off and dried. It is an orange powder, giving a yellow solution in water and concentrated sulphuric acid and yielding after-coppered yellow dyeings on cotton and staple fibre which have very good fastness properties. If, instead of 23.4 parts of 4-acetylamino-acetoacetic acid anilide 17.7 parts of acetoacetic acid anilide or 20.7 parts of 2-methoxy-acetoacetic acid anilide are used as second coupling component, then similar yellow dyestuffs with equally good properties are obtained.

*Example 3*

28.7 parts of 1-(3'-amino-4'-hydroxybenzoylamino)-4-aminobenzene-3-carboxylic acid are dissolved cold in 400 parts of water with 8 parts

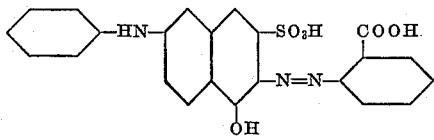

of caustic soda lye. 13.8 parts of sodium nitrite are mixed in and the whole added dropwise, in the cold with stirring, to 40 parts of concentrated hydrochloric acid and 80 parts of water. After the excess mineral acid has been neutralised with sodium bicarbonate, the tetrazo compound is coupled with 18.9 parts of 1-(4'-aminophenyl)-3-methyl-5-pyrazolone dissolved in 200 parts of water and 20 parts of sodium bicarbonate. An aqueous solution of 28.1 parts of 2-acetylamino-6-hydroxynaphthalene-8-sulphonic acid, 20 parts of sodium carbonate and 150 parts of pyridine is then allowed to flow into the intermediate product. After stirring for several hours at room temperature the disazo dyestuff formed, of the formula

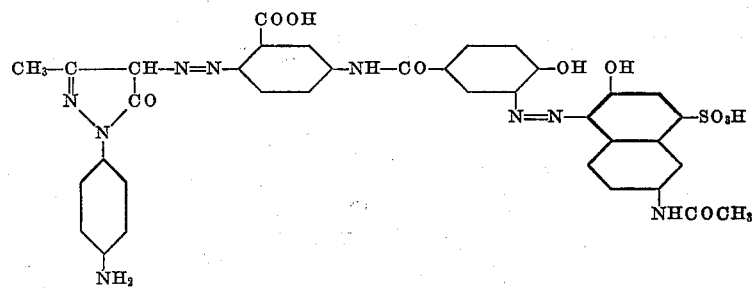

is salted out, filtered off and dried. It is a dark brown powder which dissolves in water and in concentrated sulphuric acid to give a reddish brown solution. It gives brown after-coppered dyeings on cotton and staple fibre, having very good fastness to light and to wet conditions.

If instead of 28.1 parts of 2-acetylamino-6-hydroxy-naphthalene-8-sulphonic acid there are used in the above example: 35.8 parts of 2-(4'- or 3' - aminobenzoylamino) - 6 - hydroxynaphthalene-8-sulphonic acid, 39.25 parts of 2-(3'-amino-4' - chlorobenzoylamino) - 6 - hydroxynaphthalene-8-sulphonic acid, or 34.3 parts of 2-benzoylamino-6-hydroxynaphthalene-8-sulphonic acid, then dyestuffs with similar properties are obtained.

*Example 4*

28.7 parts of 1-(3'-amino-4'-hydroxybenzoylamino)-4-aminobenzene-3-carboxylic acid are tetrazotised as described in Example 3, the excess mineral acid is neutralised with sodium carbonate and the tetrazo compound is coupled one-sidedly with 31.5 parts of 2-phenylamino-5-hydroxynaphthalene-7-sulphonic acid dissolved in 400 parts of water and 20 parts of sodium carbonate. After the intermediate product is formed it is combined with 19.2 parts of 4-amino-acetoacetic acid anilide dissolved with 50 parts of sodium carbonate in 200 parts of water, to give the disazo dyestuff of the formula

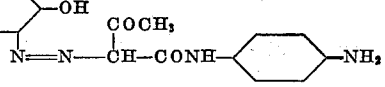

The dyestuff is salted out, filtered off and dried. It is a brownish black powder dissolving in water and concentrated sulphuric acid to give a red solution. It gives violet-brown after-coppered dyeings with very good fastness properties on cotton and staple fibre.

If, instead of 19.2 parts of 4-amino-acetoacetic acid anilide, there are used as second coupling component: 17.7 parts of acetoacetic acid anilide or 23.4 parts of 4-acetylamino-acetoacetic acid anilide, then similar brown dyestuffs with equally good fastness properties are obtained.

*Example 5*

28.7 parts of 1-(3'-amino-4'-hydroxybenzoylamino)-4-aminobenzene-3-carboxylic acid are tetrazotised in the same way as described in Example 3, the excess mineral acid is neutralised with sodium bicarbonate and the tetrazo compound then coupled with 18.9 parts of 1-(4'-aminophenyl)-3-methyl-5-pyrazolone dissolved in 200 parts of water and 20 parts of sodium bicarbonate to give the intermediate product. When coupling is complete, an aqueous solution of 22.4 parts of 1-hydroxynaphthalene-4-sulphonic acid, 20 parts of sodium carbonate and 150 parts of pyridine are allowed to flow in. After stirring for several hours, formation of the disazo dyestuff of the formula

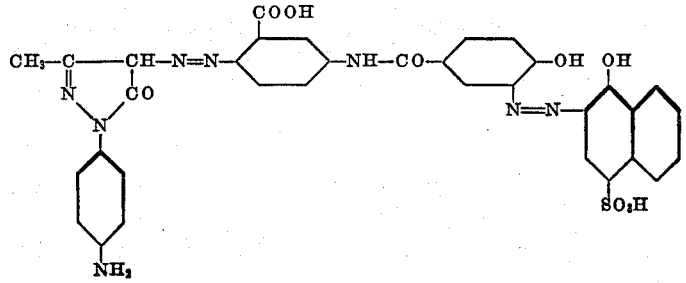

is complete. It is salted out, filtered off and dried. The new dyestuff is a dark-brown powder giving a dirty olive-brown solution in water and a red one in concentrated sulphuric acid. Cellulose fibres are dyed in brown shades which have excellent fastness properties after treatment with copper salts.

If the 22.4 parts of 1-hydroxynaphthalene-4-sulphonic acid in this example are replaced by 22.4 parts of 2-hydroxynaphthalene-7-sulphonic acid, then a similar dyestuff with equally good properties is obtained.

Example 6

28.7 parts of 1-(3'-amino-4'-hydroxybenzoylamino)-4-aminobenzene-3-carboxylic acid are tetrazotised as described in Example 3 and the excess mineral acid is neutralised with sodium carbonate. The tetrazo compound obtained is coupled with 37.5 parts of 2-(4'-hydroxy-3'-carboxyphenylamino)-5-hydroxynaphthalene-7-sulphonic acid dissolved in 300 parts of water containing 20 parts of sodium carbonate. After the intermediate product is formed it is combined with 20.7 parts of 2-methoxyacetoacetic acid anilide, a further 5 parts of sodium carbonate being added, to give a disazo dyestuff, having the formula

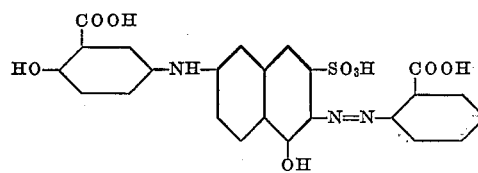

The dyestuff is salted out, filtered off and dried. It is a brownish black powder dissolving in water to give a violet-red colour and in concentrated sulphuric acid to give a wine-red colour. It dyes cellulose fibres in violet-brown shades which have very good general fastness properties on after-treating with copper salts. If the 37.5 parts of 2-(4'-hydroxy-3'-carboxy-phenylamino)-5-hydroxynaphthalene-7-sulphonic acid is replaced as starting component by 35.9 parts of 2-(3'-carboxyphenylamino)-8-hydroxynaphthalene-6-sulphonic acid, then a similar dyestuff with equally good properties is obtained.

Example 7

The intermediate compound obtained by uniting the tetrazo compound from 28.7 parts of 1-(3'-amino-4'-hydroxy-benzoylamino)-4-amino-benzene-3-carboxylic acid with 18.9 parts of 1-(4'-aminophenyl)-3-methyl-5-pyrazolone as described in Example 5 is coupled with 28.1 parts of 1-acetylamino-8-hydroxy-naphthalene-4-sulphonic acid in the presence of 20 parts of sodium carbonate and 150 parts of pyridine. The disazo dyestuff thus formed, of the formula

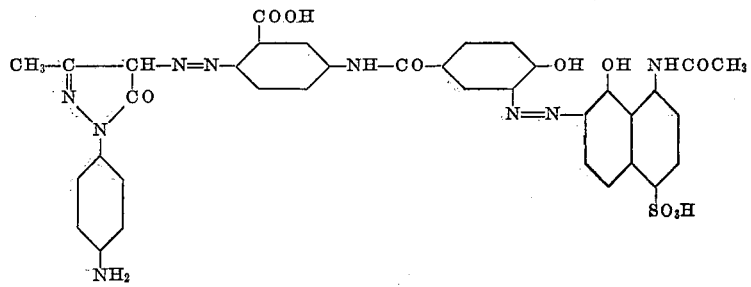

is salted out, filtered off and dried. It is a dark brown powder giving a reddish brown aqueous solution and a brownish red one in sulphuric acid. It dyes cellulose fibres in a brown shade. On after-treatment with copper salts dyeings with remarkable fastness under wet conditions and to light are obtained.

If the 28.7 parts of 1-(3'-amino-4'-hydroxy-benzoylamino)-4-aminobenzene-3-carboxylic acid are replaced by 31.7 parts of 1-(3'-amino-4'-hydroxy-5'-methoxybenzoylamino)-4-aminobenzene-3-carboxylic acid or by 32.15 parts of 1-(3'-amino-4'-hydroxy-6'-chlorobenzoylamino)-4-aminobenzene-3-carboxylic acid, then similar dyestuffs with equally good fastness properties are produced.

Example 8

28.7 parts of 1-(3'-amino-4'-hydroxybenzoylamino)-4-aminobenzene-3-carboxylic acid are tetrazotised as described in Example 3. The excess mineral acid is neutralised with solium bicarbonate and the tetrazo comopund then coupled with 23.4 parts of 4-acetylamino-acetoacetic acid anilide, dissolved in 200 parts of water, in the presence of 20 parts of sodium bicarbonate, to give the intermediate product. After coupling is complete an aqueous solution of 22.4 parts of 2-hydroxy-naphthalene-4-sulfonic acid, 20 parts of sodium carbonate and 150 parts of pyridine is allowed to flow in. After stirring for several hours at room temperature coupling is complete and the diazo dyestuff formed, having the formula

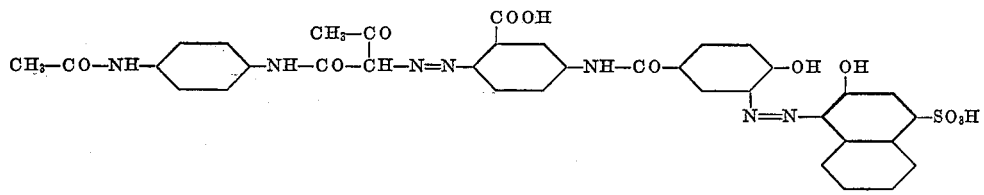

is salted out, filtered off and dried. It is a brownish black powder, giving a brown solution in water and an olive-brown one in concentrated sulphuric acid. On natural or regenerated cellulose fibres it gives brown dyeings which have very good fastness properties when after-coppered.

If, instead of 23.4 parts of 4-acetylamino-acetoacetic acid anilide there are used 9.8 parts of 3-methyl-5-pyrazolone or 24.3 parts of 1-(4'-chlorophenyl)-3-methyl-5-pyrazolone, then similar brown dyestuffs with equally good properties are obtained.

*Example 9*

1.5 parts of the dyestuff of Example 1 are dissolved in 3000 parts of water and 2 parts of sodium carbonate contained in a dyebath. 100 parts of cotton are entered into the bath at 40–50°, the temperature raised to 90–95° in the course of 30 minutes; 30 parts of sodium sulphate are added and dyeing continued for 45 minutes at this temperature. Afterwards the dyed goods are rinsed cold and after-treated in a fresh bath with 2 parts of crystalline copper sulphate in 2000 parts of water and 2 parts of 30% acetic acid at 70° for 30 minutes. Rinsing and drying are carried out as usual. The cotton is dyed in a yellowish brown shade with excellent fastness properties.

The following table contains a number of further examples ilulustrative of the present invention. The method of manufacture is always the same as that of the foregoing examples. In the first column the diamine is shown, in the second, the first coupling component, and in the third, the second coupling component.

| | Diamine of Formula I | First coupling component | Second coupling component | Shade of the after-coppered dyeing on cellulose fibres |
|---|---|---|---|---|
| 1 | 1-(3'-amino-4'-hydroxy-benzoylamino)-4-aminobenzene-3-carboxylic acid. | 4-amino-acetoacetic acid anilide. | 4-amino-acetoacetic acid anilide. | yellow. |
| 2 | 1-(3'-amino-4'-hydroxy-6'-methoxybenzoylamino)-4-aminobenzene-3-carboxylic acid. | ____do____ | ____do____ | Do. |
| 3 | 1-(3'-amino-4'-hydroxy-6'-chlorobenzoylamino)-4-aminobenzene-3-carboxylic acid. | 1-(4'-aminophenyl)-3-methyl-5-pyrazolone. | 1-(4'-aminophenyl)-3-methyl-5-pyrazolone. | yellowish brown. |
| 4 | ____do____ | ____do____ | 4-amino-acetoacetic acid anilide. | Do. |
| 5 | 1-(3'-amino-4'-hydroxy-5'-bromobenzoylamino)-4-aminobenzene-3-carboxylic acid. | 4-amino-acetoacetic acid anilide. | 1-(4'-aminophenyl)-3-methyl-5-pyrazolone. | Do. |
| 6 | 1-(3'-amino-4'-hydroxy-benzoylamino)-4-aminobenzene-3-carboxylic acid. | 1-(4'-aminophenyl)-3-phenyl-5-pyrazolone. | 1-(4'-aminophenyl)-3-phenyl-5-pyrazolone. | Do. |
| 7 | ____do____ | ____do____ | acetoacetic acid anilide. | Do. |
| 8 | ____do____ | ____do____ | 2-methoxy-acetoacetic acid anilide. | Do. |
| 9 | ____do____ | ____do____ | 2-methoxy-acetoacetic acid anilide-monosulphonic acid. | Do. |
| 10 | ____do____ | ____do____ | 1-(4'-amino-3'-sulphophenyl)-3-methyl-5-pyrazolone. | Do. |
| 11 | 1-(3'-amino-4'-hydroxy-5'-methylbenzoylamino)-4-aminobenzene-3-carboxylic acid. | 1-(4'-aminophenyl)-3-methyl-5-pyrazolone. | 1-(3'-chlorophenyl)-3-methyl-5-pyrazolone. | Do. |
| 12 | ____do____ | ____do____ | acetoacetic acid-α-naphthalide. | Do. |
| 13 | 1-(3'-amino-4'-hydroxy-benzoylamino)-4-aminobenzene-3-carboxylic acid. | 1-(4'-aminophenyl)-3-phenyl-5-pyrazolone. | 2-amino-5-hydroxynaphthalene-7-sulphonic acid. | brownish bordeaux. |
| 14 | ____do____ | ____do____ | monoazo from: 5-amino-2-hydroxybenzene-1-carboxylic acid acid 2-amino-5-hydroxynaphthalene-7-sulphonic acid. | violet brown. |
| 15 | ____do____ | ____do____ | monoazo from: 5-nitro-2-aminobenzoic acid acid 2-amino-5-hydroxynaphthalene-7-sulphonic acid. | Do. |
| 16 | ____do____ | 2-acetyl-amino-6-hydroxynaphthalene-8-sulphonic-acid. | 4-methyl-sulphonacetoacetic acid anilide. | brown. |
| 17 | ____do____ | 1-acetyl-amino-8-hydroxynaphthalene-4-sulphonic acid. | ____do____ | Do. |
| 18 | 1-(3'-amino-4'-hydroxy-6'-chlorobenzoylamino)-4-aminobenzene-3-carboxylic acid. | 1-(4'-amino-phenyl)-3-methyl-5-pyrazolone. | 2-acetylamino-5-hydroxy-naphthalene-1-sulphonic acid. | Do. |
| 19 | 1-(3'-amino-4'-hydroxy-6'-methoxybenzoylamino)-4-aminobenzene-3-carboxylic acid. | 1-(4'-methylphenyl)-3-methyl-5-pyrazolone. | 2-(4'-amino-benzoylamino)-6-hydroxynaphthalene-8-sulphonic acid. | Do. |
| 20 | 1-(3'-amino-4'-hydroxy-benzoylamino)-4-amino-benzene-3-carboxylic acid. | ____do____ | 1-hydroxy-naphthalene-5-sulphonic acid. | Do. |
| 21 | ____do____ | 1-(4'-amino-phenyl)-3-methyl-5-pyrazolone. | 2-(4'-hydroxy-3'-carboxy-phenylamino)-8-hydroxynaphthalene-6-sulphonic acid. | Do. |
| 22 | ____do____ | ____do____ | 2-(4'-amino-benzoylamino)-8-hydroxynaphthalene-6-sulphonic acid. | Do. |
| 23 | ____do____ | 4-chloraceto-acetic acid anihilide. | 2-benzoylamino-5-hydroxy-naphthalene-7-sulphonic acid. | yellowish brown. |
| 24 | ____do____ | 2-chloraceto-acetic acid anilide. | ____do____ | Do. |
| 25 | ____do____ | 2-ethoxy-acetoacetic acid anilide. | 2-acetylamino-5-hydroxy-naphthalene-7-sulphonic acid. | Do. |
| 26 | 1-(3'-amino-4'-hydroxy-6'-methylbenzoylamino)-4-aminobenzene-3-carboxylic acid. | acetoacetic acid anilide. | 1-hydroxynaphthalene-4-sulphonic acid. | Do. |
| 27 | ____do____ | ____do____ | 1-hydroxynaphthalene-5-sulphonic acid. | Do. |
| 28 | 1-(3'-amino-4'-hydroxy-6'-methylbenzoylamino)-4-aminobenzene-3-carboxylic acid. | ____do____ | 2-hydroxy-naphthalene-4-sulphonic acid. | Do. |
| 29 | ____do____ | ____do____ | 2-hydroxy-naphthalene-6-sulphonic acid. | Do. |
| 30 | ____do____ | ____do____ | 2-hydroxy-naphthalene-7-sulphonic acid. | Do. |
| 31 | 1-(3'-amino-4'-hydroxy-benzoylamino)-4-amino-benzene-3-carboxylic acid. | monoazo from: 5-amino-2-hydroxybenzene-1-carboxylic acid acid 2-amino-5-hydroxy-naphthalene-7-sulphonic acid. | 4-acetylamino-acetoacetic acid anilide. | brown. |
| 32 | ____do____ | ____do____ | 1-phenyl-3-methyl-5-pyrazolone. | Do. |
| 33 | 1-(3'-amino-4'-hydroxy-5'-methoxybenzoylamino)-4-aminobenzene-3-carboxylic acid. | 1-(4'-amino-phenyl)-3-methyl-5-pyrazolone. | 1-acetylamino-5-hydroxy-naphthalene-7-sulphonic acid. | Do. |
| 34 | ____do____ | 3-methyl-5-pyrazolone. | 2-acetylamino-6-hydroxy-naphthalene-8-sulphonic acid. | Do. |
| 35 | 1-(3'-amino-4'-hydroxy-benzoylamino)-4-amino-benzene-3-carboxylic acid. | ____do____ | ____do____ | Do. |
| 36 | ____do____ | ____do____ | 1-hydroxy-naphthalene-4-sulphonic acid. | Do. |

| | Diamine of Formula I | First coupling component | Second coupling component | Shade of the after-coppered dyeing on cellulose fibres |
|---|---|---|---|---|
| 37 | 1-(3'-amino-4'-hydroxy-benzoylamino)-4-amino-benzene-3-carboxylic acid. | 1-(4'-amino-3'-sulphophenyl)-3-methyl-5-pyrazolone. | 2-benzoylamino-5-hydroxynaphthalene-7-sulphonic acid. | brown. |
| 38 | ....do.... | ....do.... | 2-benzoylamino-6-hydroxynaphthalene-8-sulphonic acid. | Do. |
| 39 | ....do.... | 1-(4'-amino-3'-sulphophenyl)-3-methyl-5-pyrazolone. | 2-phenylamino-5-hydroxynaphthalene-7-sulphonic acid. | Do. |
| 40 | ....do.... | 4-methyl-acetoacetic acid anilide. | 2-hydroxynaphthalene-7-sulphonic acid. | Do. |
| 41 | ....do.... | 4-acetylaminoacetoacetic acid anilide. | 4-acetylaminoacetoacetic acid anilide. | yellow. |
| 42 | ....do.... | 1-(4'-aminophenyl)-3-methyl-5-pyrazolone. | 1-methylamino-8-hydroxynaphthalene-4-sulphonic acid. | brown. |
| 43 | ....do.... | ....do.... | 1-phenylamino-8-hydroxynaphthalene-4-sulphonic acid. | Do. |
| 44 | 1-(3'-amino-4'-hydroxy-5'-bromobenzoylamino)-4-aminobenzene-3-carboxylic acid. | ....do.... | 1-(4'-aminophenyl)-3-methyl-5-pyrazolone. | yellowish brown. |
| 45 | ....do.... | ....do.... | 2-acetylamino-6-hydroxynaphthalene-8-sulphonic acid. | brown. |

What I claim is:

1. A polyazo dyestuff corresponding to the formula

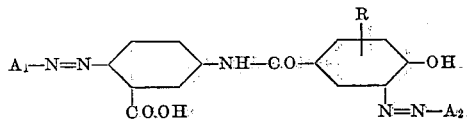

wherein $A_1$ and $A_2$ each represents a member selected from the group consisting of 5-pyrazolone radicals, acetoacetic acid arylide radicals and naphtholsulphonic acid radicals coupling in o-position to the hydroxyl group thereof, with the condition that at most only one A being a naphthol sulphonic acid, R represents a member selected from the group consisting of H, Br, Cl, $CH_3$ and $CH_3O$ radicals.

2. A polyazo dyestuff corresponding to the formula

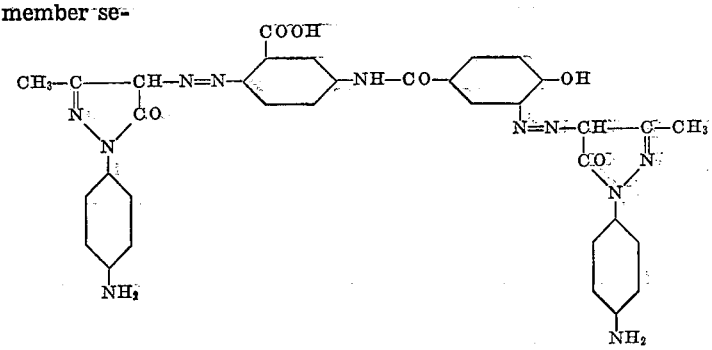

3. A polyazo dyestuff corresponding to the formula

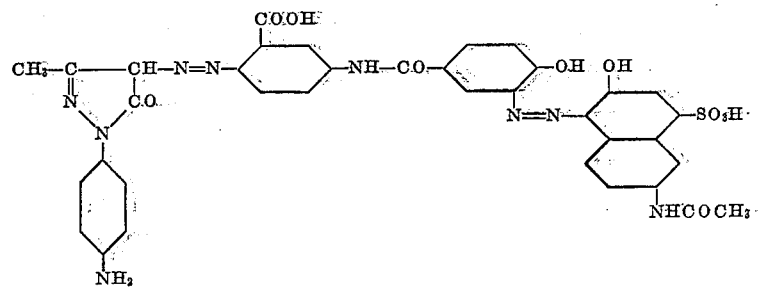

4. A polyazo dyestuff corresponding to the formula

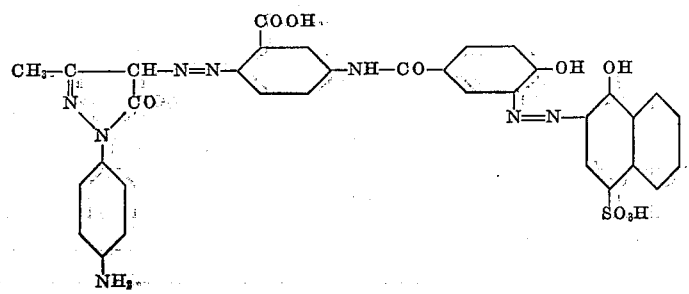

5. A polyazo dyestuff corresponding to the formula
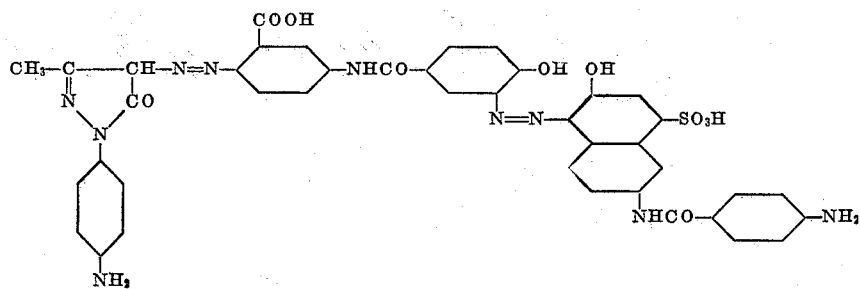
6. A polyazo dyestuff corresponding to the formula
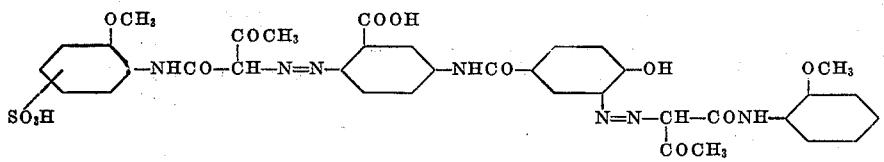
PETER HINDERMANN.
REFERENCES CITED
The following references are of record in the file of this patent:
UNITED STATES PATENTS
| Number | Name | Date |
|---|---|---|
| 2,200,414 | Cliffe | May 14, 1940 |
| 2,228,321 | Messmer | Jan. 14, 1941 |
| 2,283,829 | Suckfull et al. | May 19, 1942 |